US005080821A

United States Patent [19]

Lutringer

[11] Patent Number: 5,080,821

[45] Date of Patent: Jan. 14, 1992

[54] HYDROCARBON SOLVENT COMPOSITION

[76] Inventor: Philippe Lutringer, Am Allee JB Clement, Livry, Gargan, France

[21] Appl. No.: 450,846

[22] Filed: Dec. 14, 1989

[30] Foreign Application Priority Data

Dec. 23, 1988 [FR] France ................................ 88 17106

[51] Int. Cl.[5] .......................... C09D 9/00; C11D 7/22; C11D 7/50

[52] U.S. Cl. .................................... 252/170; 252/162; 252/171; 252/DIG. 8

[58] Field of Search ................. 252/170, 171, DIG. 8, 252/162

[56] References Cited

U.S. PATENT DOCUMENTS

| | | | |
|---|---|---|---|
| 1,835,724 | 12/1931 | Simms | 252/DIG. 8 |
| 1,974,744 | 9/1934 | Klinkstein | 252/DIG. 8 |
| 2,721,848 | 10/1955 | Vitalis | 252/DIG. 8 |
| 3,784,477 | 1/1974 | Esposito | 252/DIG. 8 |
| 4,801,397 | 1/1989 | Flanagan et al. | 252/154 |
| 4,810,421 | 3/1989 | Marchesini | 252/546 |
| 4,830,772 | 5/1989 | Van de Mark | 252/170 |
| 4,859,359 | 8/1989 | DeMatteo et al. | 252/174.15 |

*Primary Examiner*—Prince Willis, Jr.
*Assistant Examiner*—J. Silbermann
*Attorney, Agent, or Firm*—Darby & Darby

[57] ABSTRACT

The invention relates to a liquid antiadhesive degreasing and cleaning product, composed of denatured 95° alcohol, and of a mixture of carbonated solvents.

This solvents mixture includes preferably essence C, essence F and essence E; a preferred composition of the product includes, by volume, 50% alcohol, 5% essence E, 15% essence C and 30% essence F.

2 Claims, No Drawings

HYDROCARBON SOLVENT COMPOSITION

The present invention relates to a cleaning composition, notably an antiadhesive liquid product allowing the extraction of adhering matters of the chewing gum type or others, and to a stain remover allowing the removal of ink stains and graffitis.

The extraction of chewing gums is generally carried out with the assistance of sprayed liquid chemical products or of cold sprays under pressure and/or blocks of ice so as to harden the gum. The removal from the coatings is then carried out by tearing them off. The result of this method is a decisive disadvantage due to the tearing off of the fibers of said coatings which accompanies the removal.

Products have been developed, which on the contrary make the gum softer so that the removal is not accompanied by a tearing off of fibers. However, the softening obtained is often accompanied by the oil stain effect, the gum being dissolved in part and spreading out on the coating.

As compared to the various antiadhesive stain removal or detergent compositions known, the compositions according to the invention offer a number of unexpected advantages, amongst which:

they allow the complete and rapid extraction of gums, even adhering since a long time, that is dry and hardened;

the removal is thus carried out without tearing off fibers, nor by application of cold liquids sprayed under pressure (cold sprays);

they leave no traces behind;

they can be used notably on supports which are metallic, of a plastic material, woven with natural or artificial fibers, in leather or in glass.

The composition according to the invention still has as an object its use for cleaning varnishes, unsticking silicone products, or removing ink from metallic, woven surfaces or others.

This last application is particularly efficient when fighting against graffitis or other inscriptions made with inks or paints and often difficult to remove. The composition can be used on any support without deteriorating it.

The object of the invention is an antiadhesive, stain remover and cleaning liquid composition, characterized in that it contains denatured alcohols of the 95° ethanol type and a mixture of carbonated solvents.

The proportions by volume of alcohol and solvents mixture may vary respectively from 25% to 70% and from 30% to 75%.

Preferably, the composition is characterized in that the alcohol is present in a proportion varying from 35% to 55% by volume, and the solvents mixture is present in a complementary proportion.

The composition is still remarkable by the following characteristics:

the carbonated solvents mixture includes:

essence C including at least: paraffinic compounds in C6 and C7 at least, isoparaffinic compounds in C7 and C8 at least, and cycloparaffinic compounds in C6 and C7 at least;

essence E including at least: paraffinic compounds and isoparaffinic compounds in C6, C7, C8 and C9 at least, and cycloparaffinic compounds in C6, C7, C8 and C9 at least, the contents in aromatic compounds not exceeding 5%;

essence F including at least: paraffinic and is paraffinic compounds in C7, C8, C9 and C10 and at least, cycloparaffinic compounds in C7, C8, C9 and C10 at least, and aromatic compounds in C7, C8, and C9 at least, the contents in aromatic compounds being at least 5 %;

essence F is present in a proportion varying from 25% to 50% by volume;

essence E is present in a proportion varying from 5% to 25% by volume;

essence C is present in a proportion varying from 10% to 35% by volume.

Preferably, the composition includes, by volume, 50% alcohol, 5% essence E, 15% essence C and 30% essence F.

Another object still of the invention is the use of the composition thus defined for removing stains (for example ink or paint stains, notably pigmented inscriptions and graffitis).

By way of example, a composition according to the invention has been made by mixing the following products:

50 $cm^3$ 95° ethanol
5 $cm^3$ essence E
15 $cm^3$ essence C
35 $cm^3$ essence F.

The essence C used consists of the following hydrocarbon compounds:

| | |
|---|---|
| paraffinic compounds | in C6: 35% by volume |
| | in C7: 12% by volume |
| isoparaffinic compounds | in C6: 28% by volume |
| | in C7: 10% by volume |
| | in C8: 1% by volume |
| cycloparaffinic compounds | in C6: 8% by volume |
| | in C7: 6% by volume |

The essence E used consists of less than 5% of aromatic compounds and is made of the following hydrocarbonated compounds:

| | |
|---|---|
| paraffinic and isoparaffinic compounds | in C6: 1% by volume |
| | in C7: 25% by volume |
| | in C8: 31% by volume |
| | in C9: 9% by volume |
| cycloparaffinic compounds | in C6: 1% by volume |
| | in C7: 15% by volume |
| | in C8: 15% by volume |
| | in C9: 3% by volume |

The essence F used consists of at least 5% of aromatic compounds and is made of the following hydrocarbonated compounds:

| | |
|---|---|
| paraffinic and isoparaffinic compounds | in C7: 19% by volume |
| | in C8: 22% by volume |
| | in C9: 19% by volume |
| | in C10: 7% by volume |
| cycloparaffinic compounds | in C7: 6% by volume |
| | in C8: 7% by volume |
| | in C9: 6% by volume |
| | in C10: 2% by volume |
| aromatic compounds | in C7: 3% by volume |
| | in C8: 6% by volume |
| | in C10: 3% by volume |

Of course, this choice of essences is not limiting and it is possible to vary the composition thereof, notably for increasing the dissolution activity by increasing the percentage of aromatic compounds, or with longer carbonated chains.

The product obtained with the proportions indicated exhibits a miscibility degree which varies with the alcohol; for example, if one requires a composition well homogeneous and without emulsion, one has to increase the proportion of alcohol.

But the product can be used in the form of an emulsion, for example with a high content of mixture of essences of the order of 60% to 70%. It seems that with such a high content of essence, the stain removal and antiadhesive efficiency are optimal.

Such a composition used on a carpet gives the following results:

a gum kept captured in the fibers only for a short time (a few hours) is removed within a few moments of the order of five to ten seconds;

a gum having adhered to the fibers for a long time (several days or months) is softened and removed within a period of the order of one minute. But the result is the same: the gum is entirely removed, and in both cases the carpet does not show any trace of the composition and on the other hand does not show any trace of deterioration.

This composition, applied on a metallic surface (staircase step) provides comparable results and generally the removal is still quicker.

Finally, this composition, applied on a surface (metallic wooden panel, leather surface, walls . . .) bearing an inscription, dissolves it very quickly. The only thing to do is then to wipe it away with a clean rag so that it disappears, and the support does not show any trace of the product nor of the inscription.

It is also possible to add to the composition others secondary products properties of which are known in itself, without modifying the composition: for example one can introduce an antiemulsifying agent or perfumes, these products being juxtaposed to the composition, without giving any new or unexpected results.

I claim:

1. A solvent composition for the removal of chewing gum from a surface, comprising:

(a) a mixture of hydrocarbon solvents including:
  (i) 10% to 35% by volume of essence C;
  (ii) 5% to 25% by volume of essence E;
  (iii) 25% to 50% by volume of essence F; and
(b) balance ethanol.

2. The solvent composition of claim 1, comprising, by volume, 50% ethanol, 15% essence C, 5% essence E, and 30% essence F.

* * * * *